United States Patent [19]

Bush et al.

[11] Patent Number: 4,518,277

[45] Date of Patent: May 21, 1985

[54] SELF-LOCKING MECHANICAL CENTER JOINT

[75] Inventors: Harold G. Bush, Yorktown; Richard E. Wallsom, Newport News, both of Va.

[73] Assignee: The United States of America as represented by the Administrator of the National Aeronautics and Space Administration, Washington, D.C.

[21] Appl. No.: 387,646

[22] Filed: Jun. 11, 1982

[51] Int. Cl.³ .............................................. F16C 11/00
[52] U.S. Cl. .................................. 403/102; 403/322; 403/348
[58] Field of Search ................ 403/348, 349, 102, 92, 403/322; 285/283; 292/256.6; 16/297

[56] References Cited

U.S. PATENT DOCUMENTS

| 633,054 | 9/1899 | Tanner ................................. 403/92 |
| 1,180,965 | 4/1916 | Baly . |
| 1,199,732 | 9/1916 | Miller . |
| 2,926,012 | 2/1960 | Maher . |
| 2,927,787 | 3/1960 | Maher . |
| 3,136,007 | 6/1964 | Maher et al. . |
| 3,187,373 | 6/1965 | Fisher . |
| 3,628,812 | 12/1971 | Larralde et al. . |
| 3,815,941 | 6/1974 | Snyder . |
| 3,895,471 | 7/1975 | Kolb . |
| 4,222,591 | 9/1980 | Haley . |
| 4,393,541 | 7/1983 | Hujsak et al. ................... 403/102 X |

Primary Examiner—Andrew V. Kundrat
Attorney, Agent, or Firm—Wallace J. Nelson; Howard J. Osborn; John R. Manning

[57] ABSTRACT

A device for connecting, rotating and locking together a pair of structural half-columns 11 is disclosed. The device is composed of an identical pair of cyclindrical hub assemblies 12,12a connected at their inner faces by a spring loaded hinge 20; each hub assembly having a structural half-column attached to its outer end. Each hub assembly has a spring loading locking ring 14,14a member movably attached adjacent to its inner face and includes a latch 32,32a member for holding the locking ring in a rotated position subject to the force of its spring. Each hub assembly also has a hammer 36,36a member for releasing the latch on the opposing hub assembly when the hub assemblies are rotated together. The spring loaded hinge connecting the hub assemblies rotates the hub assemblies and attached structural half-columns together bringing the inner faces of the opposing hub assemblies into contact with one another. The hammer members 36,36a release the latch members 32,32a on the opposing hub assemblies 12,12a and the locking ring members 14,14a rotate together to join the half-columns and form a single structural column.

11 Claims, 9 Drawing Figures

SELF-LOCKING MECHANICAL CENTER JOINT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to improvements in mechanical joints, and more particularly concerns a hinged self-locking mechanical center joint for joining columnar structures. This invention is especially useful in packing columnar members for transportation into outer space and for assembling columnar structures in outer space with remotely controlled mechanical devices.

The Space Shuttle Transportation System is being developed by the National Aeronautics and Space Administration to provide the capability of placing a relatively large payload into outer space. This system will make feasible the construction of large structures in outer space. However, even though the Space Shuttle represents an improvement in orbital payload capability, it is presently limited to a cargo bay fifteen feet in diameter and sixty feet in length. Because of this limitation on cargo space and because transportation of construction materials into outer space is expensive compact storage is essential.

In an earlier invention (Bush, U.S. Pat. No. 4,259,821), lightweight, hollow body half-columns for use in constructing large truss structures were disclosed. These half-columns are compactly stored by stacking them one inside another and may be transported efficiently. In Bush, (U.S. Pat. No. 4,259,821), the half-columns are stored separately and joined manually by the astronauts immediately prior to use. This method, however, burdens the astronauts with the difficult task of connecting the half-columns together under spatial vacuum conditions. The present invention is designed to provide a method of both automatically joining these half-columns and allowing them to be compactly stored. The present invention permits the half-columns disclosed in Bush (U.S. Pat. No. 4,259,821) to be stored one inside another after they are joined together by providing a connecting joint that automatically rotates the half-columns together and locks them into place once they are removed from their storage position. Existing joints are incapable of simultaneously performing these functions.

Most existing mechanical joints are not self-locking, i.e., they must be locked manually and are not feasible for use in outer space. Existing self-locking mechanical joints result in either single point contact locks or unevenly spaced multiple point contact locks. These joints are not locked evenly about their mating faces. Therefore, they are of uneven strength and are not competent to withstand all type of anticipated loads. For example, a hinged joint that is locked at a single point opposite the hinge will not be competent to withstand a large bending load applied in the plane perpendicular to the plane containing the lock and hinge. Such a joint is not acceptable for use in a structural column that might be subject to such a bending load. Because the structural columns anticipated for use in spatial truss structures might be subjected to this type of load, an unevenly locked joint is not acceptable for use in such a truss structure. Other existing center joints either have non-symmetrical hubs or have hubs with obstructed interiors and when used to join pairs of hollow body half-columns, do not allow the pairs of the half-columns to be stacked one inside the other.

Accordingly, it is an object of this invention is to provide a self-locking mechanical joint that allows joined pairs of half-columns to be stacked one inside the other and thus facilitate compact storage and transportation into outer space.

Another object of this invention to provide an evenly locked mechanical joint that is competent to withstand all type loads.

Yet another object of this invention is to provide a hinged self-locking mechanical center joint for joining pairs of half-columns which automatically rotates a pair together and locks when released from transportation position.

A further object of the present invention is to provide a mechanical joint having evenly spaced multiple contact points providing spring-urged wedging joint locking capability.

SUMMARY OF THE INVENTION

According to the present invention the foregoing and additional objects of the present invention are attained by providing a self-locking center joint for a pair of half-columns comprising a pair of opposing hub assemblies which are joined by a spring loaded hinge. Each hub assembly includes a cylindrical hub with a locking ring movably attached around the hub at its hinged end. Each locking ring is provided with a plurality of "L" shaped teeth projecting outward and parallel to the hub body. Each locking ring is rotated around the hub to which it is attached subject to the force of a spring attached to both the locking ring and the hub. The locking ring is held in a rotated position by a pivotal latch located on the hub. In using this invention, a half-column is attached to each hub assembly and each locking ring is latched in an open position. When the hub assemblies are rotated together a projection on each assembly trips the latch on each opposing assembly releasing each of the spring urged locking rings for relative rotation. As the locking rings rotate their "L" shaped teeth mesh and are wedged together to form a locked center joint.

BRIEF DESCRIPTION OF THE DRAWINGS

A more complete appreciation of the invention and many of the attendant advantages thereof will be readily apparent as the same becomes better understooood by reference to the following description when considered in connection with the accompanying drawings wherein.

DETAILED DESCRIPTION OF THE INVENTION

Figure 1:
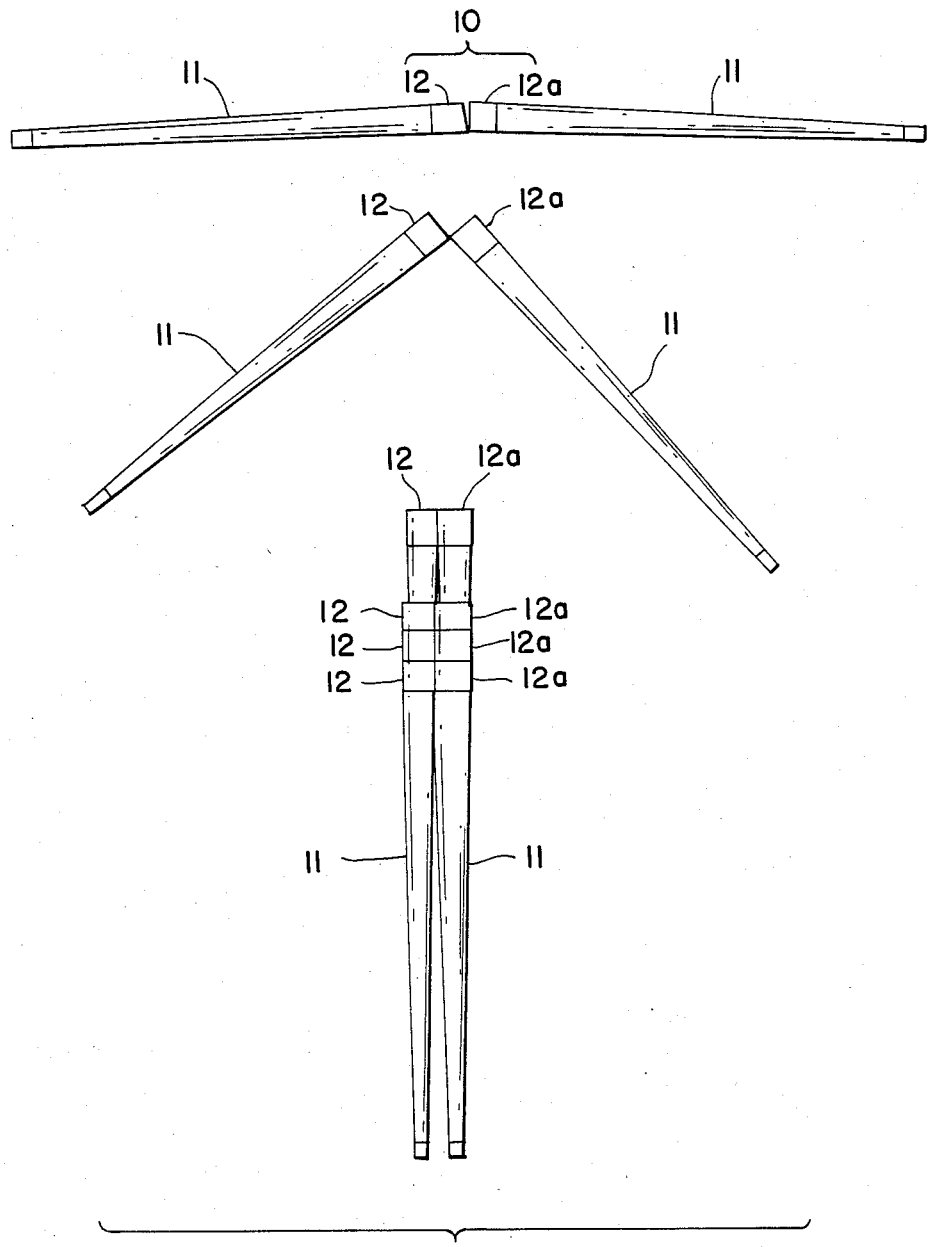
FIG. 1 is a view showing a plurality of half-column elements in various positions from the nested and stowed position for transport through sequential rotational positions thereof by the self-locking center joints of the present invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, and referring more particularly to FIG. 1, the numeral 10 designates generally a self-locking mechanical center joint for joining hollow body half-columns 11. FIG. 1 shows generally how half-columns 11, connected by center joint 10, are stored in an open position one inside another prior to use and how they are automatically rotated together to form a single column when removed from this storage position. Half-columns 11 have hollow, conical bodies and can be stacked one inside another when separate. In order to form a usable structural column from a hinged pair of half-columns, the half-columns must be rotated together and locked into place. This is accomplished by center joint 10 of the present invention.

Figure 2:
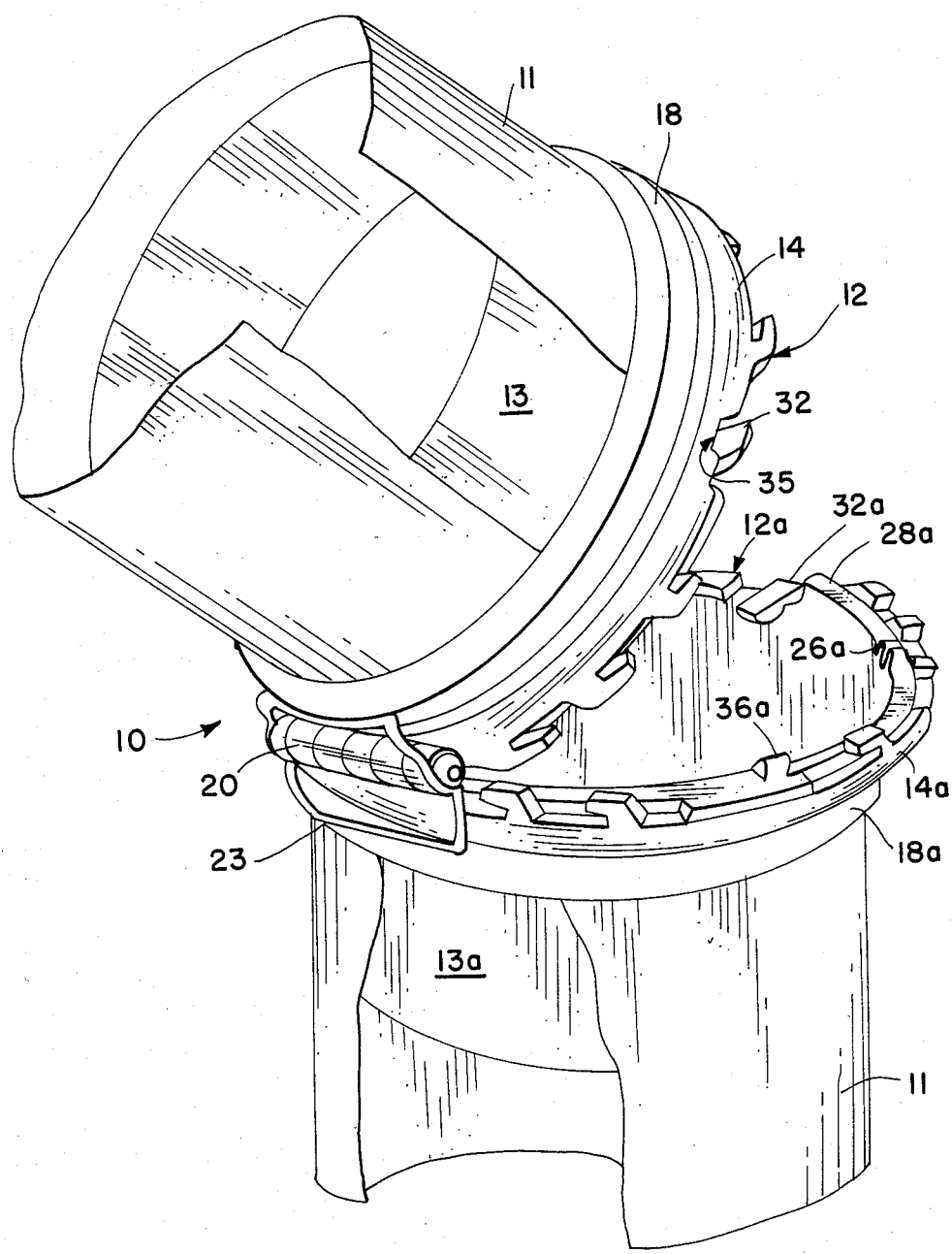
FIG. 2 is a perspective view of the joint shown in FIG. 1 in the open position.
Figure 3:
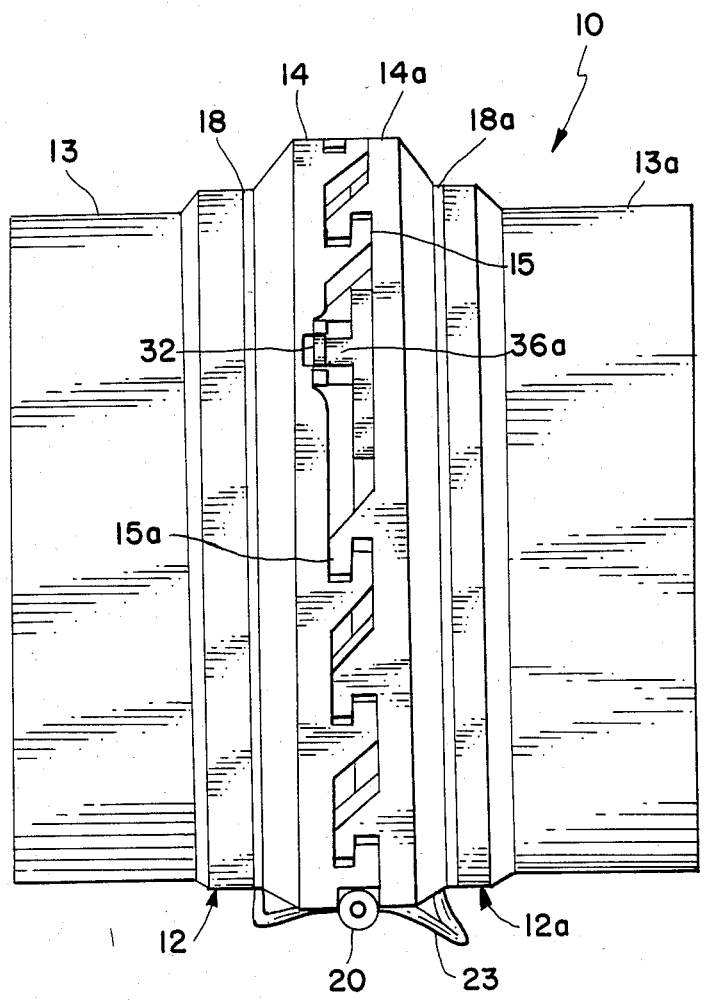
FIG. 3 is a perspective view of a single joint of the present invention in locked position and with the half-column segments omitted therefrom.

Referring now more particularly to FIGS. 2 and 3, center joint 10 includes a pair of opposing hub assemblies 12 and 12a which are connected by hinge 20. Hinge 20 is energized by spring 23. Each hub assembly 12 and 12a includes a hub member 13 and 13a, a locking ring 14 and 14a, a retaining ring 18 and 18a, a latch 32 and 32a, and a hammer 36 (FIG. 4) and 36a. In FIG. 2 center joint 10 is in a partially open position in the process of being closed by spring 23. FIG. 2 shows locking rings 14 and 14a being held in a cocked position by downward pivoted latches 32 and 32a. In FIG. 3 center joint 10 is in a closed position. In this position latches 32 and 32a are pivoted upward and locking rings 14 and 14a are meshed together. Since hub assemblies 12 and 12a are substantially identical, only hub assembly 12 will be described in further detail, it being understood that corresponding parts on hub assembly 12a will be referred to by corresponding numbers with the letter "a".

Figure 4:
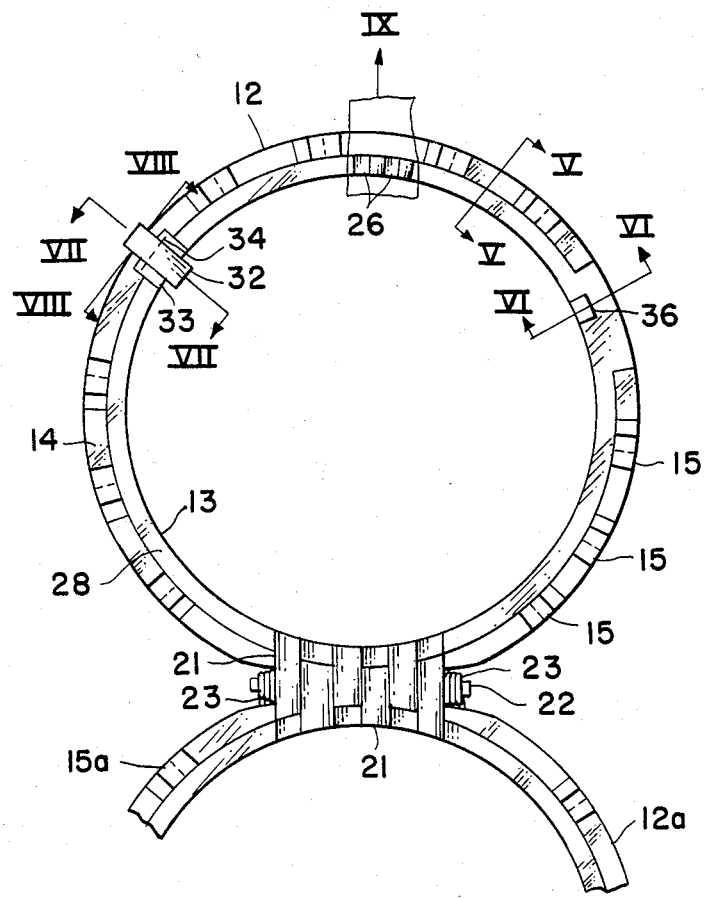
FIG. 4 is a top view of one joint half or joint hub assembly shown in FIGS. 1-3.
Figure 5:
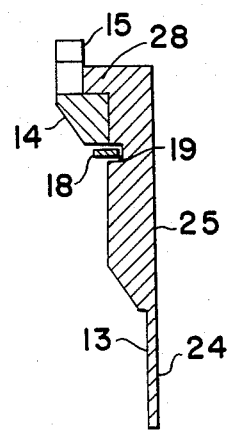
FIG. 5 is a sectional view taken along line V—V of FIG. 4.

Referring now more particularly to FIGS. 4-9, the details for each part of hub assembly 12 will be described. Hub member 13 is cylindrical and, as is shown in FIG. 5, has walls which are thicker at one end. The thinner portion, hub wall 24, is the smooth portion of hub member 13 to which half-columns 11 are attached. The thicker portion of hub member 13, designated by numeral 25, is circumscribed by retaining ring groove 19 and has a flanged outer edge 28. FIG. 4 shows a plan view of the inner face of hub assembly 12 in which locking ring 14 is being held in a cocked position around hub member 13 by downward pivoted latch 32. As shown therein the flanged edge 28 of hub member 13 incorporates hinge members 21, latch 32, stabilizing grooves 26 and hammer 36.

Hinge members 21 are conventional perforated teeth-like projections designed to mesh with opposing hinge members 21a. As shown in FIG. 4, opposing hinge members 21 and 21a are spring loaded by coil spring 23 and held together by hinge pin 22.

Figure 7:
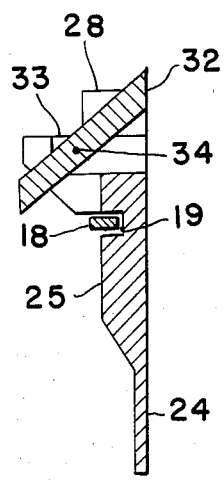
FIG. 7 is a sectional view taken along line VII—VII of FIG. 4.

FIG. 7, a cross-section taken along line VII—VII of FIG. 4, shows the orientation of latch 32 when pivoted downward into slot 35. Latch 32 is pivotally attached to flanged edge 28 at projections 33 by latch pin 34 and is shaped to fit into a slot 35 located in locking ring 14.

Figure 8:
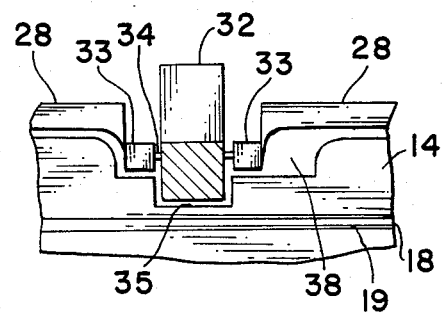
FIG. 8 is a part sectional view taken along line VIII—VIII of FIG. 4.

FIG. 8, a cross-section taken along line VIII—VIII of FIG. 4, shows another view of latch 32 as pivotally attached to projections 33 by pin 34 and fitting into slot 35.

Figure 9:
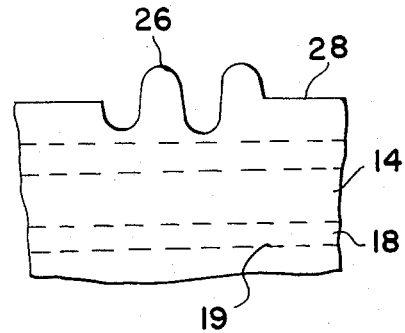
FIG. 9 is a view looking in the direction of arrow IX in FIG. 4.

FIG. 9 shows a side view of stabilizing grooves 26 taken along line IX—IX of FIG. 4. Stabilizing grooves and projections 26 on flanged edge 28 of hub member 13. Corresponding grooves and projections 26 on 26a on flanged edge 28a of hub member 13a mesh with grooves 26 when the hub assemblies 12 and 12a are rotated together. These grooves provide joint 10 with additional ability to withstand torsional loads.

Figure 6:
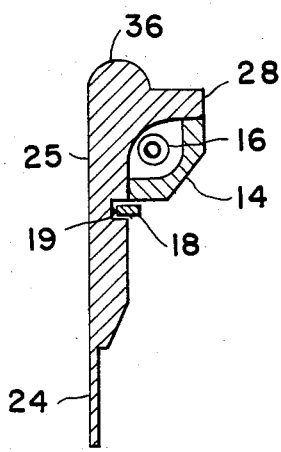
FIG. 6 is a sectional view taken along line VI—VI of FIG. 4.

As shown in FIGS. 4 and 6, hammer 36 is an arch shaped protrusion from flanged edge 28. Hammer 36 is located on flanged edge 28 adjacent to an extension of edge 28. Hammer 36 is located such that it contacts opposing latch member 32a when hub assemblies 12 and 12a are rotated together.

Referring now more particularly to FIGS. 4, 5, 6 and 8, the details of locking ring 14 will be described. FIG. 4 shows locking ring 14 attached around hub member 13. As shown therein, locking ring 14 has a ringlike body with 'L' shaped teeth 15 projecting upward from its circumference. As shown in FIGS. 5 and 6, locking ring 14 is held around hub member 13 by retaining ring 18 and the flanged edge 28 of hub member 13 such that it may rotate around hub member 13. As shown more clearly in FIG. 6, locking ring 14 is concave and, along with the thick portion 25 of hub member 13, forms a cavity housing a coil spring 16. Only the portion of locking ring 14 located under extension 37 of flanged edge 28 is concave in shape. The remainder of locking ring 14 conforms in shape with the flanged edge 28 of hub member 13 as shown in FIG. 5. In the cavity formed by the concave portion of locking ring 14 spring 16 is in contact at its respective ends with both locking ring 14 and hub member 13 and is compressed when locking ring 14 is rotated to its cocked position. When held in this position spring 16 urges rotation of locking ring 14 in the opposite direction. Locking ring 14 is held in this cocked position by latch 32 pivoted into slot 35 (FIG. 8). The recessed portion 38 (FIG. 8) of locking ring 14 permits locking ring 14 to rotate past projections 33.

Referring again to FIGS. 5-7, retaining ring 18 works in conjunction with flanged edge 28 of hub member 13. Retaining ring 18 is a gapped ring that is stretched to fit around hub wall 25 and released to snap into retaining ring groove 19. FIG. 2 shows the position of retaining ring 18 around hub member 13.

OPERATION

In using the present invention to join two structural half-columns which have been previously attached to hub portions 24 and 24a, locking rings 14 and 14a are rotated until latch 32 and 32a can be pivoted into latch slots 35 and 35a. This procedure compresses spring 16 which in turn applies a constant rotational force on locking ring 14. At this stage the half-column center joint assembly is stored in a fully open position for transportation into outer space. When center joint 10 is in such a fully open position (as is shown in FIG. 1), compressed hinge spring 23 exerts a rotational force on half-columns 11 and 11a and hub assemblies 12 and 12a.

When columns are needed for use in constructing a truss or similar structure in outer space, half-columns 11 are removed from their storage position. Spring 23 then rotates hub assemblies 12 and 12a together such that hammers 36 and 36a strike latches 32a and 32 respectively. The force of this blow pivots latches 32 and 32a which disengages latch slot 35 and 35a, respectively, and move to a position parallel with extension 33 and 33a. Because latches 32 and 32a no longer restrain locking rings 14 and 14a, the rotational force provided by locking ring springs 16 and 16a cause locking rings 14 and 14a to rotate. As locking rings 14 and 14a rotate, their "L" shaped teeth 15 mesh together and form a secure, evenly locked joint for half-columns 11, thus forming a single structural column. The abutting faces of each mating pair of teeth 15 and 15a (FIGS. 2 and 3) are tapered slightly into wedge or ramp type surfaces to ensure even surface contact therebetween at all points of contact. This wedging action of the teeth is maintained by springs 16 and 16a to thereby prevent the joint from opening during vibrations or under loads. This structural column is then used in whatever capacity is desirable by the astronauts.

The advantages of the self-locking center joint are numerous, and, since it is self-locking and self-deploying, it is especially adapted for use in adverse environments where manual manipulation is difficult or impossible.

Another advantage of the present invention is that since it utilizes identical opposing hub assemblies fewer parts need to be machined and its production will be less expensive than a similar joint using nonidentical hubs.

Another advantage of the present invention is that it allows pre-joined hollow body half-columns to be stacked one inside the other. This compact storage facilitates transportation in vehicles of limited size.

Still another advantage of the present invention is that it provides a self-locking mechanical center joint which creates an evenly spaced, multiple point lock competent to withstand all type loads.

It is to be understood that the form of the invention herewith shown and described is to be taken only as a preferred embodiment and various changes may be made in the shape, size and arrangement of parts. For example, equivalent elements may be substituted for those illustrated and described herein, parts may be reversed, and certain features of the invention may be utilized independent of the use of other features, all without departure from the spirit or scope of the invention as defined in the subjoined claims. For example, the "L" shaped locking teeth may be replaced by a locking means of a different configuration, or the locking ring spring may be replaced by some different type energizing means. These and other variations and modifications of the present invention will be readily apparent to those skilled in the art in the light of the above teachings.

What is claimed as new and desired to be secured by Letters Patent of the United States is:

1. A self-locking joint for securing two structural members in linear relationship along a first axis comprising:
   a pair of substantially identical hinged hub members disposed in side-by-side relationship and adapted for connection to separate structural members;
   means for effecting relative rotative movement of said hinged hub members about a second axis transverse to said first axis to position said hub members in face-to-face abutting relationship; and
   substantially identical rotatable means disposed on each said hub member and having portions thereof adapted to mesh for locking said hinged hub members in the face-to-face abutting relationship.

2. The self-locking joint of claim 1 wherein said means for effecting relative rotative movement of said hinged hub members includes a spring member normally biasing said hub members for relative rotative movement about said second axis.

3. The self-locking joint of claim 1 wherein each of said pair of identical hub members is of tubular configuration with a first end thereof adapted for connection to the structural members and a second open end face adapted for engagement with an identical face of the other member of said pair.

4. The self-locking joint of claim 1 wherein said substantially identical rotatable means for locking said hinged hub members includes a recessed flanged shoulder on the open end face of each of said pair of hub members and a locking ring rotatably disposed on said recessed shoulder, said locking ring including a plurality of locking teeth thereon and serving to individually engage a plurality of substantially identical teeth on the locking ring of the other member of said hub pair to thereby lock said pair of hub members together.

5. The self-locking joint of claim 4 wherein said plurality of locking teeth are individually provided with tapered wedge faces with the taper on each tooth being in an opposite direction to the taper on the tooth engaged during joint locking.

6. The self-locking joint of claim 4 and further including a loaded spring actuation device on each of said hub members for effecting relative rotation of each said locking ring when said pair of hubs are disposed in face-to-face relationship.

7. The self-locking joint of claim 6 including a coil spring abutting both said hub member and said locking ring forming said spring actuation device and wherein said locking ring energizes said coil spring upon rotating said locking ring.

8. The self-locking joint of claim 7 including means for holding said locking ring in an energized position.

9. The self-locking joint of claim 8 including a trigger mechanism for releasing said means for holding said locking ring in an energized position when said pair of hubs are disposed in face-to-face relationship.

10. The self-locking joint of claim 9 including a latch pivotally attached to the hub member and a corresponding slot in said locking ring forming said mechanism for holding said locking ring in an energized position.

11. The self-locking joint of claim 10 including a hammer forming said trigger mechanism and wherein the hammer on one hub member engages and releases the latch on the other of said hub members.

* * * * *